March 17, 1925.  1,529,645
W. G. ALDEEN
AUTOMATIC SCREW MACHINE
Filed July 3, 1920   4 Sheets-Sheet 2
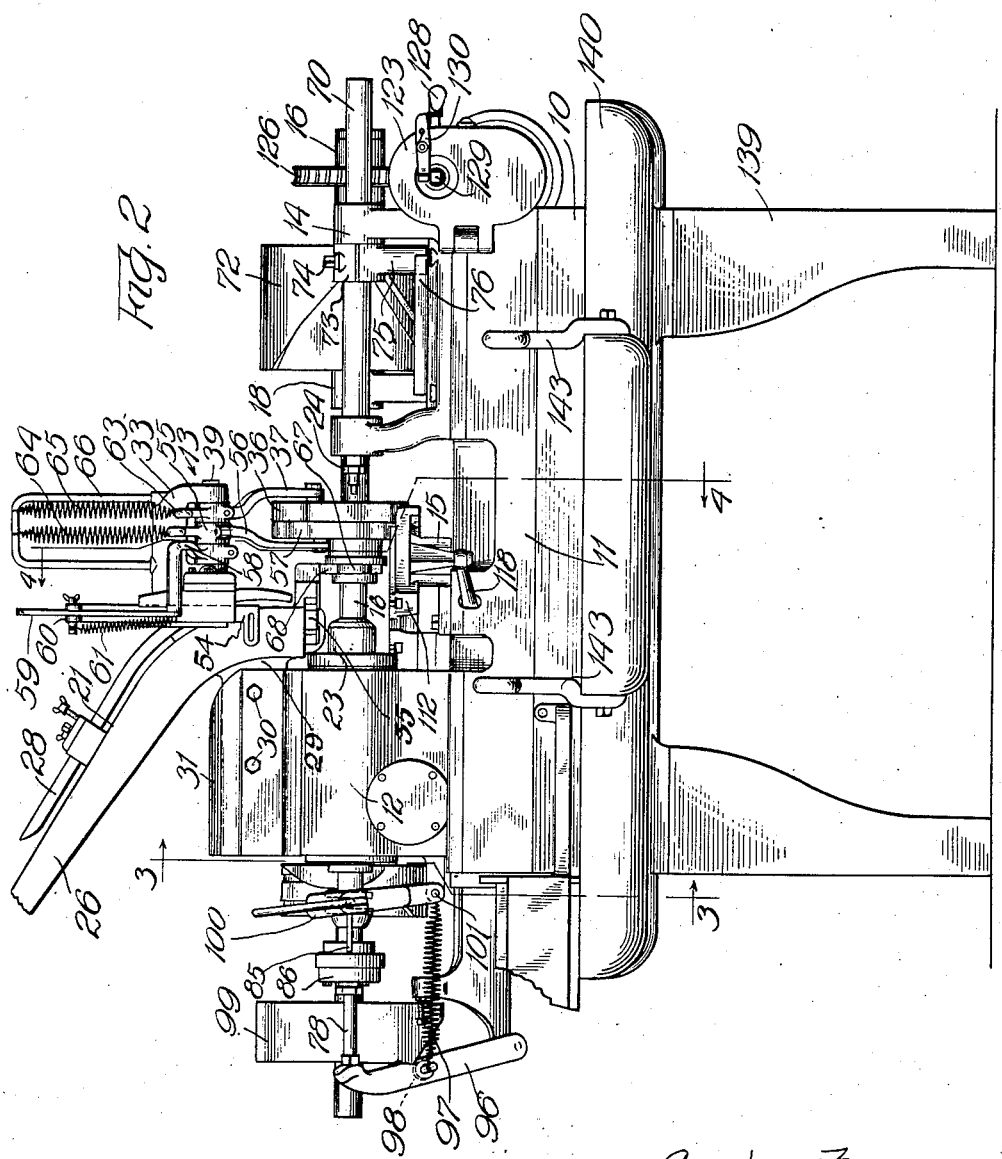
Inventor
Wilhelm G. Aldeen
By Miller Chindahl Parker
Attys March 17, 1925.  1,529,645
W. G. ALDEEN
AUTOMATIC SCREW MACHINE
Filed July 3, 1920  4 Sheets-Sheet 3

Inventor
Wilhelm G. Aldeen
By Miller Chindahl Parker
Attys

March 17, 1925.                       1,529,645
W. G. ALDEEN
AUTOMATIC SCREW MACHINE
Filed July 3, 1920          4 Sheets-Sheet 4
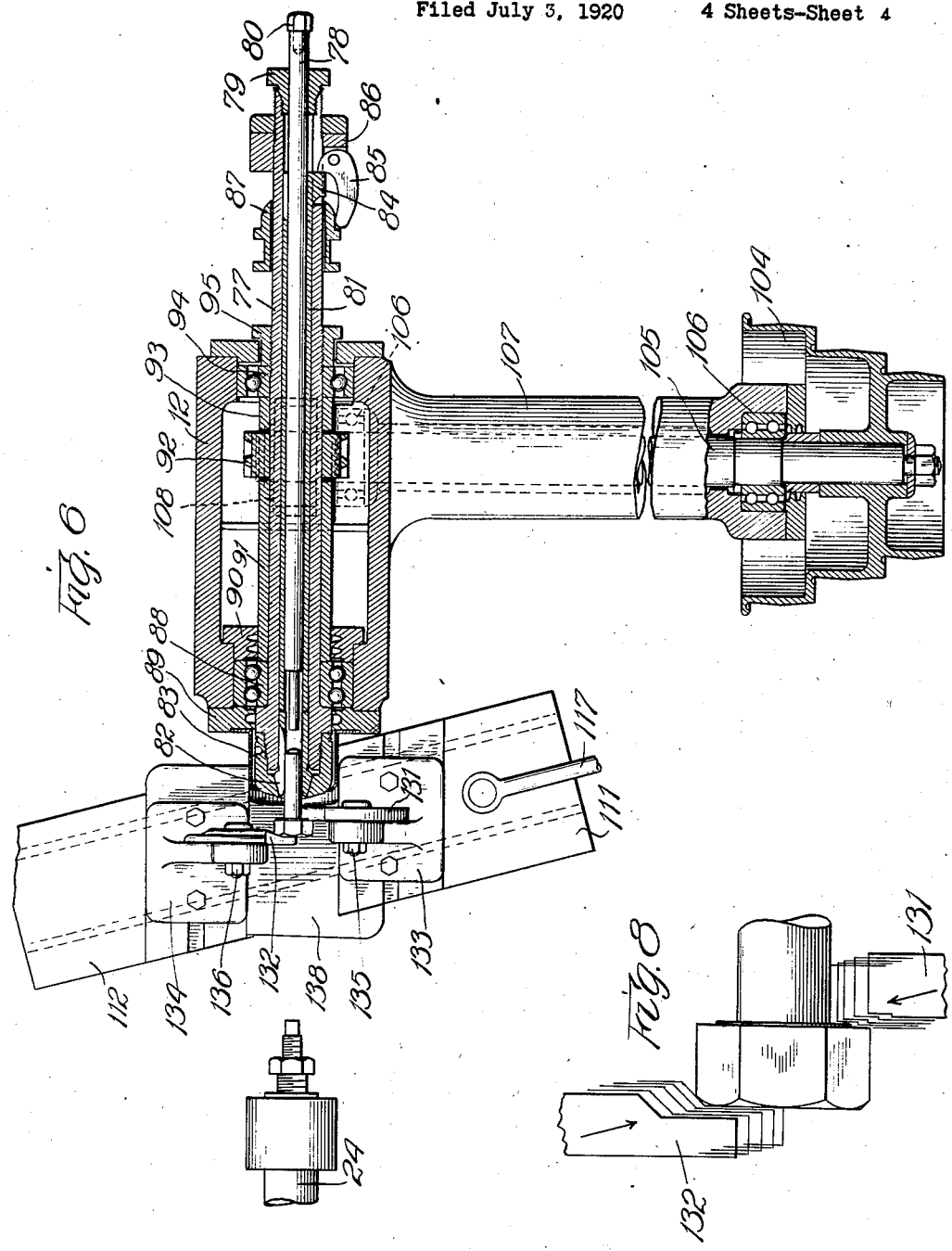
Inventor
Wilhelm G. Aldeen
By Miller Chindahl Parker
Attys Patented Mar. 17, 1925.

1,529,645

UNITED STATES PATENT OFFICE.

WILHELM GEDOR ALDEEN, OF ROCKFORD, ILLINOIS, ASSIGNOR TO NATIONAL LOCK CO., OF ROCKFORD, ILLINOIS, A CORPORATION OF DELAWARE.

AUTOMATIC SCREW MACHINE.

Application filed July 3, 1920. Serial No. 393,923.

*To all whom it may concern:*

Be it known that I, WILHELM GEDOR ALDEEN, a citizen of the United States, residing at Rockford, in the county of Winnebago and State of Illinois, have invented certain new and useful Improvements in Automatic Screw Machines, of which the following is a specification.

My invention relates to automatic machinery for the manufacture of large quantities of duplicate parts.

One object of my invention is to provide a novel bolt-head-shaving machine in which the work parts are automatically ejected from the work holding means at predetermined intervals in the machine operation by a spring actuated and cam controlled member.

While I have illustrated a bolt-head-shaving machine in which the principles of my invention have been embodied, it should be clearly understood that with respect to certain features, my invention is applicable to automatic machinery generally and is not limited to any single machine.

Another object is to provide an improved method of machining stock to secure the highest efficiency from the cutting tool; and to devise apparatus for carrying out the improved method.

Another object is to provide an arrangement whereby transmission of power to certain parts of the machine is automatically prevented when the parts in question are being manually adjusted in setting up the machine or at any other time.

Another object is to provide a convenient and efficient means for receiving and delivering the finished product.

Further objects and advantages of my invention will become apparent as the description proceeds.

Figure 1:
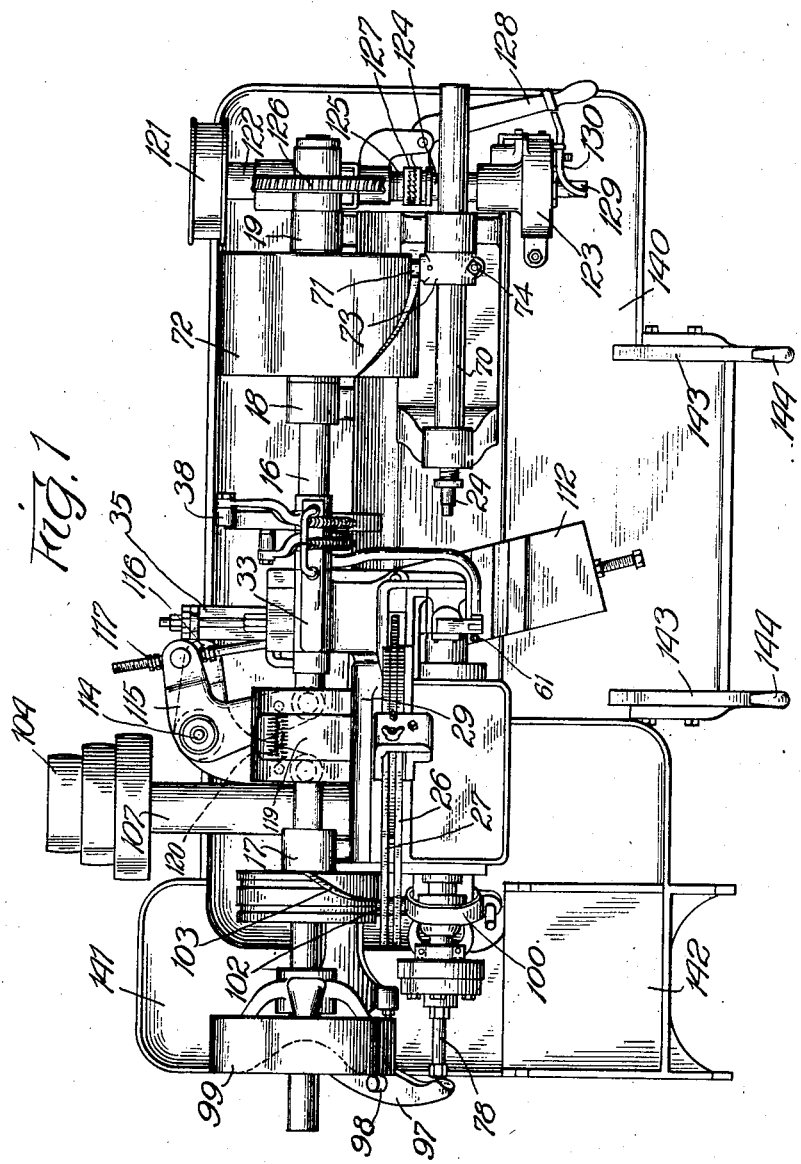
Figures 3, 5:
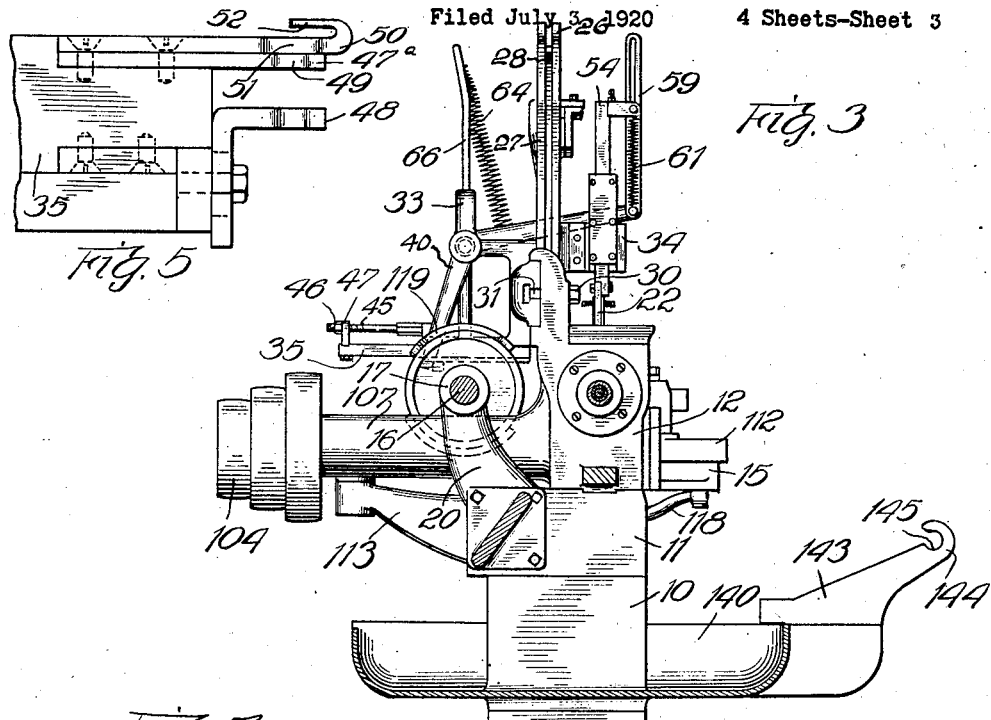
Figures 4, 7:
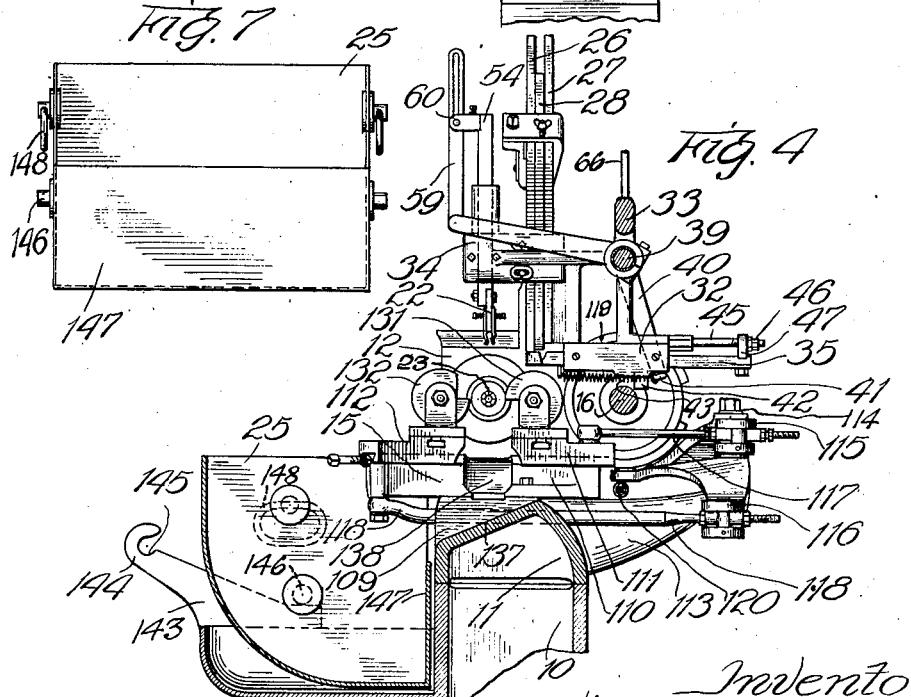

In the accompanying drawings, Figure 1 is a plan view, and Fig. 2 is a side elevation of a machine embodying the principles of my invention. Figs. 3 and 4 are sections on the lines 3—3 and 4—4 respectively of Fig. 2. Fig. 5 is an enlarged detail view of the horizontal bolt forwarder and Fig. 6 is an enlarged fragmentary detail partly in section of the headstock and spindle showing a piece of stock and the tools for machining the same. Fig. 7 is a view of the receiving box and Fig. 8 is a diagrammatic view illustrating the action of the tools.

In the embodiment of my invention selected for illustration, a main base 10 is adapted to support a sub-base 11 mounted thereon and clamped or bolted thereto in any suitable manner so as to be readily removed for the substitution of a different sub-base. The sub-base illustrated is adapted to carry various special automatic machinery. I have illustrated a headstock 12, a unitary automatic bolt feeding mechanism 13, a tail stock 14 and a cross slide 15. The sub-base 11 also supports the cam shaft 16 in bearings 17, 18 and 19 at the ends of arms 20 integrally formed with or permanently attached to the sub-base.

The main parts of the automatic set up I have illustrated, comprise broadly, means for allowing a bolt to slide down a guideway or chute 21; a horizontal bolt transfer mechanism adapted to receive a bolt from the lower end of the chute 21 and carry it across under a resilient vertical bolt transfer holder 22; a vertical transfer mechanism adapted to actuate the holder 22 to take the bolt from the horizontal transfer mechanism and move it down in front of the chuck 23; a pusher 24 carried by the tail stock and adapted to push the bolt into the chuck 23; means for clamping the bolt in position; automatically actuated tools for performing an operation on the bolt, in this instance for finishing the head; and means for knocking the bolt out of the chuck and for delivering it into a receiving box or pan 25.

*Feeding mechanism.*

I have provided a unitary bolt feeding mechanism adapted to be removably associated with the other parts of the complete automatic tool and to perform completely all the necessary operations for intermittently delivering a bolt in front of the chuck 23 where it can be inserted by the pusher 24. The operating mechanism comprises spaced bars 26 and 27 defining a slot adapted to receive the shanks of the bolts, and an adjustable retaining plate 28 adapted to overlie the heads of the bolts and prevent them from falling out of the slot as they slide down it. A frame 29 is adapted to support the guide plates 26 and 27 and is bolted to the upper part of the headstock 12 by bolts 30, the headstock or the frame being slotted as at 31 to allow longitudinal adjustment of the feeding mechanism. The same frame or casting carries a laterally projecting portion 32 (See Fig. 4), a U-shaped bearing bracket 33 and a vertical slide bracket 34 to support the various parts of the automatic feed mechanism.

The lateral projection 32 contains guideways for a transverse slide 35 forming the horizontal bolt transfer means. Intermittent motion is transmitted to the horizontal bolt transfer from a cam 36 splined on and rotating with the cam shaft 16, through an arm 37 carrying a suitable roller 38 to engage the cam and rigidly fastened to a rock shaft 39 pivotally supported in the U-shaped bracket 33 referred to above. At its rear end the rock shaft 39 carries a projecting arm 40 having a hook shaped end portion 41 adapted to engage a depending lug 42 on the slide 35 and move it over from the position shown in Fig. 4 to a position in vertical alignment with the axis of the chuck 23 and under the vertical transfer holder 22. A tension spring 43 attached at one end to a stationary part of the machine and at the other to a finger on the slide 35, tends to return the slide to the position illustrated in Fig. 4.

The proper initial position for receiving the bolt from the guides 26 and 27 may be controlled by a rod 45 and nuts 46 carried by the rod to engage an apertured lug 47 carried by the slide 35 and limit the rearward displacement thereof.

The bolt receiving elements carried by the horizontal slide are illustrated in detail in Fig. 5 and comprise a pair of spaced projecting arms 47$^a$ and 48 having cylindrical depressions 49 adapted to receive the shank of the bolt and a third projection 50 having a larger depression 51 adapted to receive the head of the bolt, and a reversely bent end 52 cooperating with the depression 51 to form a socket for the head of the bolt. The spaced projections 47$^a$ and 48 are separated to allow a suitable clearance for the entry of the resilient fingers of the vertical transfer holder 22.

The vertical transfer holder 22 is carried by a vertically slidable member 54 mounted in the bracket 34 above mentioned, and is driven from the cam shaft 16 through a sleeve 55 rotatably mounted on the rock shaft 39 and having a downwardly projecting arm 56 carrying a roller to engage the cam 57, and a laterally projecting arm 58 extending across the machine and back beside the bracket 34 for connection with a link 59. The link 59 is connected by means of a slot connection at 60 to the upper end of the vertically slidable member 54, completing the transmission. By reason of the slotted connection, when the parts move down from the position shown in Fig. 4, the holder 22 after grasping the bolt, may support the slide 54 and limit its downward movement. The load on the holder at such a time comprises the weight of the parts and also the tension of a spring 61 which may be employed for the purpose or omitted if desired. The cam 57 is shaped so as to lower the holder 22 to engage the bolt presented by the horizontal transfer mechanism and raise it again to allow the horizontal slide to be withdrawn, after which it is lowered to position in front of chuck 23 and allowed to remain there until the bolt has been pushed at least partway into the chuck by the advancing tail stock.

Both arms 37 and 56 are resiliently held in contact with the cams 36 and 57 respectively. For this purpose, I have illustrated short arms 63 connected by springs 64 and 65 extending upward at a slight inclination, to the bight of a light U-shaped bracket 66 mounted on the bracket 33 for the purpose.

The cams 57 and 36 are assembled into a unitary structure by any suitable means, as, for instance, by bolting them together, and splined on the shaft 16. A collar projecting laterally from the cams has an annular groove 67 adapted to receive a prong 68 projecting from the frame 29. Adjustment of the entire feeding mechanism longitudinally of the machine by means of the slotted connection at 31 will therefore merely slide the cams 36 and 57 along the shaft 16 without disturbing any of the other adjustments of the various parts of the feeding mechanism.

The entire feeding mechanism may therefore be adjustably mounted to present a bolt at the precise point required in front of the chuck 23. Its adjustment and operation are entirely independent of the adjustment and operation of all the other parts of the machine and it may readily be replaced by other feed mechanisms operating according to different principles or merely specially designed to handle particular sizes and shapes of stock. The bolts may be fed to the guides 26 and 27 by hand or from a magazine as desired.

The above feeding mechanism is described and claimed in my divisional application, Serial No. 698,335, filed March 10, 1924.

*Tail stock.*

The tail stock I have illustrated as part of the automatic machine disclosed, comprises a casting 14 suitably mounted on the sub-base 11 so that it may readily be replaced by other tail stocks. It supports in this instance, a longitudinally slidable spindle 70 carrying an adjustable pusher 24 in the nature of a projecting tit. Automatic reciprocation of the spindle 70 to push the stock at the proper time into the chuck 23 is provided by means of a roller 71 actuated by a large cam drum 72 carried by the cam shaft 16, and mounted on the spindle 70 by means of a suitable split collar 73 having a clamping bolt 74. A downwardly projecting arm 75 carried by the collar 72 reciprocates in the slotted portion 76 in the base of the tail stock casting to prevent rotation of the spindle 70.

Headstock.

The headstock I have illustrated comprises a casting 12, suitably mounted on the sub-base 11 so that it may be removed and replaced by other headstocks. It also supports a detachable spindle 77 which may itself be removed and replaced by other spindles without removing the headstock.

The spindle 77 supports; first, a centrally located knock out rod 78 sliding through a guide nut 79 at the end of the spindle and carrying an adjustable contact nut 80 to adjust its length. Second, chucking mechanism of any usual or preferred construction such as a sleeve 81 carrying at one end resilient jaws 82 adapted to be forced into engagement with the bolt on forward movement of the sleeve by the tapered surfaces of a detachable head piece 83; and at its rear end a plurality of projections 84 extending outwardly through slots in the wall of the spindle 77. Curved levers 85 suitably pivoted in a head 86 threaded or otherwise suitably mounted on the spindle 77 may be controlled by the usual cone 87 to move the chucking jaws into operative position.

To enable the spindle 77 to be removed it is supported near the chucking end on the inner ring 88 of a ball bearing adapted to carry both thrust and radial loads. For this purpose the outer ring of the ball bearing is held fast between a cover plate 89 and a retaining nut 90, suitably mounted in the casting 12. A spacer sleeve 91 extending rearwardly from the inner ring 88 of the front ball bearing into abutment with the face of the helical gear 92 splined on spindle 77 and the short spacer sleeve 93 occupy the space inside the headstock casting 12. The sleeve 93 abuts the inner ring 94 of the rear ball bearing which is adapted to take radial loads only. A nut 95 threaded on the spindle 77 engages this last mentioned ring 94 clamping the ring 94, sleeve 93, gear 92, sleeve 91 and front ring 88 against a shoulder at the front end of the spindle 77. Upon removal of the knockout rod, guide nut, and the mechanism for operating the chucking jaws, the nut 95 may be unscrewed and the entire spindle slid out. Sleeves 91 and 93 and gear 92 will remain inside the casting 12, and a different type of spindle may be inserted.

Suitable cams are provided for actuating the chuck jaws and the knock out rod at appropriate times. Referring to Figs. 1 and 2, a lever 96 pivoted at its lower end is normally urged by a spring 97 to actuate the knock out rod 78. A roller 98 intermediate the ends of the lever 96 engages a cam 99 carried by the cam shaft 16 to control the motion of the lever. It will be seen that by properly designing the cam 99 the bolt may be slowly pushed out of the chuck with no force greater than that of the spring 97 and that accidental blocking of the chuck will not wreck or in any way injure the machine.

The cone 87 may be engaged by a yoke 100 suitably pivoted at 101 on a lug projecting from the casting 12. The yoke 100 carries a projection 102 engaging a suitable cam 103 carried by the shaft 16.

Power is transmitted to the gear 92 to rotate the spindle 77 by means of a cone pulley 104 carried on a live axle 105 suitably mounted as in ball bearings 106 in a lateral supporting arm 107 integral with or permanently attached to the casting 12. The live axle 105 carries a gear 108 to drive the gear 92 and spindle 77.

Transverse tool slide.

The sub-base 11 illustrated has a pad 109 intermediate the end portions supporting the headstock and tail stock, upon which is bolted a cross slide 110 having guideways for the support of two tool carriages 111 and 112. These guideways extend obliquely at an angle in this instance of about 15° with a line transverse to the axis of the machine for a purpose which will be explained hereinafter. An arm 113 projecting from the sub-base 11 supports a vertical bolt 114 forming a pintle for two bell crank levers 115 and 116. The lever 115 is suitably connected by an adjustable link 117 with the tool carrier 111 and the lower lever 116 similarly connected by a link 118 extending through a hole in the pad 109 for connection with the other tool holder 112. A single double faced cam 119 is preferably employed to actuate the tool holders 111 and 112, entering between the ends of the levers 115 and 116 and forcing them apart to feed in the tool carriages. A spring 120 extending between the ends of the levers tends to pull them together and withdraw the tools from the work.

The tooling operation.

To finish a cylindrical surface with an ordinary tool, the tool should have an edge extending parallel to the axes of the spindle and similarly in finishing flat surfaces, tools are usually employed with an edge transverse to the axis of the spindle. These tools are nearly always fed into the work either in a direction parallel to or transverse to the axes of the spindle i. e. parallel to one of the cutting edges. When a tool is handled in this way, all of the cutting edge parallel to the direction of motion does no work except the extreme tip, but it is held against the surface finished by the tip, producing scratches and grooves. By feeding the tools in at an angle oblique to the cutting edge as indicated in Fig. 8, the entire length of each cutting edge operates to remove stock as the tool advances, leaving clean, polished surfaces when the tools are sharp, and using all the edge at all times to perform useful work.

The cutting tools.

The tools I prefer to employ for machining the bolt head illustrated are in the form of disks having notches ground in them as clearly indicated in Fig. 4. The disk 131 for machining the bottom of the head has a flat face and is preferably ground with the surface of the notch adjacent the cutting edge extending in a plane passing through the axis of the disk, the cutting edge therefore having neither clearance nor rake off. The disk 132 for machining the rounded upper surface of the head of the bolt is similarly ground but its side face is, of course, not plain but shaped to the curvature of the bolt head as clearly indicated in Fig. 8. Small tool holder stands 133 and 134 adjustable in slots in the tool carriages support the tools 131 and 132. In adjusting the tools to the work, it is necessary only to adjust the longitudinal position of the tool holders 133 and 134 and the depth to which the tools will be fed, which latter is accomplished by adjusting the connecting links 117 and 118. The shapes of tool shown are not only very efficient in removing the material from the bolt and durable in service, but it will be apparent that no particular skill is required in adjusting the angle at which the tool is to be presented to the work as the tool is presented at the correct angle by reason of the construction of the machine and this angle cannot be controlled by the operator, as the tools are merely bolted by bolts 135 and 136 against a flat face. The tool holders shown, therefore, are not only simpler and cheaper than the common tool post, but they automatically secure at all times the proper presentation of the tool to the work, whether operated by a skilled mechanic or not.

The cam drive.

As usual in machines of this type, the cam shaft is driven from a suitable source of power independent of the power drive to the spindle. I have illustrated a suitable power receiving element in the nature of a pulley 121 mounted on a transverse shaft supported by a sleeve 122 and extending across the tail stock end of the machine. Change gears mounted in a suitable casing 123 at the front of the machine transmit power to a sleeve 124 on the worm shaft 125 adapted to drive the worm 126 carried by the cam shaft 16. A suitable clutch 127 is used to connect the sleeve 124 to the worm shaft 125 and may be operated by a forwardly projecting hand lever 128. In setting up the machine, it is often desirable to rotate the cam shaft 16 slowly by hand while adjusting the cams carried thereby. For this purpose, the worm shaft 125 has a squared projecting end 129 on which a suitable crank may be mounted. To automatically prevent the possibility of serious accident which might result from connecting the power feed to the work shaft while the crank was in place, I have provided a pivoted lock out lever 130 having one end projecting outwardly in close proximity to the squared end 129 of the worm shaft. In mounting the crank on the worm shaft, it is necessary to raise this end of the lock out lever to get the crank on, and the other end will be thereby lowered, blocking the inward movement of the hand lever 128 so that the clutch cannot be thrown in.

Handling the finished product.

As shown in the drawings, the portion of the sub-base 11 intermediate the pad 109 and the tail stock 14, has a sloping upper surface 137 best shown in Fig. 4. The central portion of the cross slide 15 is cut away leaving an inclined surface 138 adapted to receive a bolt falling out of the chuck 23. The bolt will be directed forwardly by the surface 138 and then laterally by the surface 137 to fall into the receiving box or pan 25.

The main base 10 may be supported at a suitable elevation by legs 139 and preferably has drip pans 140 and 141 adapted to receive the cooling and lubricating fluid which may be used to cool and lubricate the cutting tools 131 and 132 and a tool rack 142 for the convenience of the operator. Inclined guideways 143 are mounted on the drip pan 140 as indicated in Figs. 1, 3 and 4 and terminate in hooked portions 144 defining sockets 145. The receiving box or pan 25 carries projecting pintles or supports 146 at its ends and when in position to receive bolts from the machine, rests adjacent the side of the main base 10 with the pintles 146 engaging the horizontal portions of the guideways 143.

As clearly shown in Fig. 4, the front wall 147 of the box 25 is of proper height to be adjacent the side of the frame 10 and sub-base 11, with its upper edge a trifle below the lowest portion of the surface 137. The box 25 may be grasped by means of handles 148 and pulled back up the inclined guides until the pintles 146 are received in the sockets 145 after which it may be tipped completely over to empty its contents into a suitable receptacle or onto a suitable conveyer belt. The empty pan may then be returned to its initial position ready to receive a fresh supply.

*Setting up.*

The operation of setting up such a machine as I have disclosed is as follows:

A sub-base 11 suited for the particular piece of work in hand, is selected from stock and placed on the main base 10. Having selected the sub-base 11 illustrated in the drawings, a suitable headstock 12 is equipped with the desired type of spindle 77 and placed in position on the sub-base 11. Transverse slide 15 and tail stock 14 are also selected from stock and put in position.

A feed mechanism 13 which may have been already adjusted to handle particular sizes and shapes of bolts or machine parts to be operated on, is selected from stock and bolted in position on the headstock 12. It will be obvious that the same headstock, tail stock and transverse slide may be used to perform a considerable number of different operations on different sorts and sizes of machine parts and that if desired, a different feeding mechanism can be used for each different part manufactured so that no adjustment of the feeding mechanism except longitudinal adjustment when it is bolted on the headstock, will be necessary.

Having selected and placed in position the different parts necessary for a complete set up, the operator engages the worm shaft 129 with a suitable crank and slowly rotates the same, adjusting the cams for performing the various operations until all the different automatic operations are performed in correct timed sequence. Upon removal of the crank and the delivery of power to the pulley 121 and cone pulley 104, the machine will automatically perform the various steps of the complete process.

It will be seen that I have provided a relatively simple and economical structure for performing the functions and processes above outlined. While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. In an automatic machine, work holding mechanism, knock-out mechanism, a shaft having a cam secured thereon, a lever mounted to engage said cam and said knock-out mechanism, and spring means connected with said lever for holding the latter in continual engagement with said cam, said cam means being constructed to allow, said spring means to move said lever for actuating said knock-out mechanism.

2. In an automatic machine, holding mechanism, knock-out mechanism, resilient means normally tending to actuate said knock-out mechanism, and cam means adapted to allow said resilient means to move said knock-out mechanism at a uniform speed determined by said cam means.

3. In a device of the class described, holding mechanism, ejecting mechanism including a freely slidable rod, a pivoted lever having one end adapted to engage and actuate said rod, resilient means urging said lever into contact with said rod, and cam means opposing the action of said resilient means and determining the motion of said rod.

4. In a device of the class described, power operated means, means for connecting and disconnecting the same to the feed mechanism of an automatic machine, means interpolated in said connection for manually actuating the feed mechanism, and means actuated by said manual means for locking said power connecting means in inoperative position.

5. In an automatic machine, power operated means, a connection between the same and said machine, an intermediate element of said connection being adapted to be manually actuated, means for disconnecting said power connection, and means for manually actuating said intermediate element, and a locking mechanism operated by said last mentioned means to lock said power connection in inoperative position.

6. In an automatic machine requiring preliminary adjustment, manual means for moving said machine for adjustment purposes, a power transmission, means for disconnecting and connecting said power transmission, and a lock associated with said manual means for locking said connecting means in inoperative position.

7. In a device of the class described, a cam shaft, a worm adapted to actuate said cam shaft, means for operating said worm manually, additional power operated means for operating said worm, and means for preventing the simultaneous connection of said power means and said manual means to said worm.

8. In an automatic machine, means for driving said machine manually, power operated means for driving said machine, and automatic means for preventing the simultaneous operation of said power means and said manual means.

9. In combination with an automatic machine, a pair of inclined tracks, a receiver, elements on said receiver engaging said tracks for supporting said receiver, and means for facilitating the moving of said receiver along said tracks, said receiver at one end of said tracks being positioned to receive the product delivered by the machine, and at the other end being pivotally supported for overturning.

10. In an automatic machine, an inclined body adapted to direct the finished product falling thereon laterally, a receiver positioned to receive the laterally directed product, and means for supporting said receiver, said means being constructed to allow the withdrawal of said receiver from receiving position into a position where it may be overturned to empty it, and for returning it to receiving position.

11. In an automatic screw machine having a body, tracks carried by said body and a receiver supported by said tracks for motion inwardly to a position adjacent the machine for receiving the product delivered thereby, and outwardly into a position clear of the machine for overturning and emptying said receiver.

12. In combination with an automatic screw machine, an inclined body portion adapted to direct the finished product falling thereon laterally, a receiver having a lateral wall, the upper edge of which is normally below said inclined portion, and means for supporting said receiver adjacent said inclined portion to receive the product or in a position spaced from said inclined portion to allow inversion of said receiver for discharging its contents into other suitable receiving or conveying means.

13. In combination with an automatic screw machine, a pair of spaced inclined guideways each of which is secured at one end to the machine body and is formed at its outer end with a hook portion, a receiver, and elements on said receiver for engaging said guideways or said hook portions to support said receiver in any one of a plurality of positions.

14. In combination with an automatic screw machine, a receiver, means for supporting said receiver in a position to receive the product delivered from said machine, and means for pivotally supporting said receiver in spaced relation with respect to said machine.

15. In a device of the class described, tooling mechanism comprising a cross slide member having a guideway formed therein which intersects the longitudinal axis of the machine at an oblique angle, a pair of tool carriers reciprocally movable in said guideway on opposite sides of the work, cam means for moving said carriers simultaneously toward the work, and a single resilient means tending to move said carriers simultaneously away from said work.

16. In a device of the class described, a pair of tool carriages positioned on opposite sides of the work and movable toward and from said work, cam means, a bell crank lever for each carriage mounted to engage said cam means, means for operatively connecting the adjacent ends of said lever to their respective carriages, and spring means connecting said bell crank levers and tending to move their adjacent ends toward each other to move said tools simultaneously away from said work.

17. In a device of the class described, tooling mechanism comprising a cross slide member, a tool carrier mounted in and reciprocally movable on said slide member on opposite sides of the work, a rod secured to each tool carrier, a lever operatively connected with each rod, cam means engaging said levers for moving said tool carriers in opposite directions, and resilient means connecting said levers and opposing the movement of said levers by said cam means.

18. The method of generating a flat surface perpendicular to the axis of rotation of a piece of work comprising moving a double edged tool in a rectilinear direction at an angle to the axis of rotation of the work, to both cutting edges, and to the longitudinal edge of the tool.

19. The method of machining a flat surface comprising moving a straight edged tool in a rectilinear direction at an angle to its longitudinal edge, the plane of the finished surface being determined by the direction of the cutting edge and not by the direction of motion of the tool.

In testimony whereof I have hereunto set my hand.

WILHELM GEDOR ALDEEN.